United States Patent
Kemppinen (10) Patent No.: US 7,499,264 B2
(45) Date of Patent: Mar. 3, 2009

(54) COMPACT DEVICES WITH TURN AND SLIDE CONCEPT

(75) Inventor: Pasi Kemppinen, Tampere (FI)

(73) Assignee: Nokia Corporation, Espoo (FI)

( * ) Notice: Subject to any disclaimer, the term of this patent is extended or adjusted under 35 U.S.C. 154(b) by 489 days.

(21) Appl. No.: 11/417,539

(22) Filed: May 3, 2006

(65) Prior Publication Data
US 2007/0259702 A1 Nov. 8, 2007

(51) Int. Cl.
*H05K 5/00* (2006.01)

(52) U.S. Cl. ........................................... 361/681

(58) Field of Classification Search ............... 361/681, 361/682, 683, 803; 439/10, 31; 345/158, 345/168, 169; 379/433.13; 16/357, 348
See application file for complete search history.

(56) References Cited

U.S. PATENT DOCUMENTS

| | | | | |
|---|---|---|---|---|
| 5,103,376 | A | * | 4/1992 | Blonder .................. 361/681 |
| 5,168,426 | A | * | 12/1992 | Hoving et al. ............. 361/681 |
| 5,566,098 | A | * | 10/1996 | Lucente et al. ............ 361/681 |
| 5,644,469 | A | * | 7/1997 | Shioya et al. ............. 361/681 |
| 6,233,138 | B1 | | 5/2001 | Osgood |
| 6,266,236 | B1 | | 7/2001 | Ku et al. |
| 6,381,128 | B1 | * | 4/2002 | Kramer ..................... 361/683 |
| 6,392,877 | B1 | | 5/2002 | Iredale |
| 6,430,038 | B1 | | 8/2002 | Helot et al. |
| 6,469,802 | B1 | | 10/2002 | Yamaguchi et al. |
| 6,504,707 | B2 | | 1/2003 | Agata et al. |
| 6,791,628 | B1 | | 9/2004 | Sellers |
| 6,819,547 | B2 | | 11/2004 | Minaguchi et al. |
| 7,065,835 | B2 | * | 6/2006 | Kuramochi .................. 16/357 |
| 7,158,634 | B2 | * | 1/2007 | Eromaki ................ 379/433.13 |
| 7,278,184 | B2 | * | 10/2007 | Kuramochi .................. 16/357 |
| 7,411,579 | B2 | * | 8/2008 | Tsuji et al. ................ 345/158 |
| 2005/0044665 | A1 | | 3/2005 | Kuramochi |

FOREIGN PATENT DOCUMENTS

| | | |
|---|---|---|
| EP | 1312999 | 5/2003 |
| EP | 1645939 | 4/2006 |
| JP | 9044097 | 2/1997 |

* cited by examiner

*Primary Examiner*—Chandrika Prasad
(74) *Attorney, Agent, or Firm*—Ware, Fressola, Van Der Sluys & Adolphson (57) ABSTRACT

The specification and drawings present a new apparatus and method for applying a turn and slide concept for opening and closing a device. A turning part of the device can rotate around a pivotal axis in an angle range, e.g., from a first position to a second position by a predetermined angle, the turning part is being pivotally connected to a first part (e.g., a base) of the device, thus opening the device by sliding a second part (e.g., a lid) from an initial position to a further position using an adjusting mechanism. The first part may comprise a first functional area and the second part may comprise a second functional area located on an exposed surface of the second part, wherein the second part is configured to cover the first functional area in the initial position and to reveal the first functional area in the second position.

28 Claims, 5 Drawing Sheets

COMPACT DEVICES WITH TURN AND SLIDE CONCEPT

FIELD OF THE INVENTION

The present invention relates to compact devices, and more specifically to applying a turn and slide concept for opening and closing the device.

BACKGROUND ART

Various devices (e.g., computers, mobile phones) comprise a processor, memory, circuitry, keyboard (typically with QWERTY), a display, etc. In portable computers, for example, the display is typically attached to the computer base by a hinge forming a single pivot axis, wherein the display can be folded down for carrying or up so that the user can select an appropriate viewing angle.

DISCLOSURE OF THE INVENTION

According to a first aspect of the invention, a device, comprises: a first part comprising a first functional area; a second part comprising a second functional area located on an exposed surface of the lid; and a turning part, pivotally connected to the first part such that the turning part is configured to turn by rotating around a pivotal axis in an angle range, wherein the second part is in an initial position and configured to cover the first functional area when the turning part is in a first position and wherein the second part is configured to slide using an adjusting mechanism to a further position revealing the first functional area when the turning part is rotated by a predetermined angle in the angle range around the pivotal axis to a second position.

According further to the first aspect of the invention, the second functional area may be a display comprising a viewing surface and the first functional area may be a keyboard.

According further to the first aspect of the invention, the first functional area may be one of: a) a keyboard, b) a display comprising a viewing surface, and c) a touch screen.

Still further according to the first aspect of the invention, the second functional area may be one of: a) a keyboard, b) a display comprising a viewing surface, and c) a touch screen.

According further to the first aspect of the invention, the predetermined angle may be 180 degrees.

According still further to the first aspect of the invention, the turning part may comprise a camera which is configured to provide at least one of: a) a video image when the turning part is in the second position and b) photo pictures when the turning part is in the first position.

According further still to the first aspect of the invention, the turning part may be configured to have a groove on a side adjacent to the second part and the second part may be configured to have a pin on a second part side adjacent to the turning part, such that when the turning part is rotated between the first position and the second position, the second part is moved between the initial position covering the first functional area and the further position which reveals the first functional area using the pin which is configured to move along the groove.

According yet further still to the first aspect of the invention, the adjusting mechanism may comprise: a hinge plate comprising at least two hinges, wherein the hinge plate is attached to the base with one of the at least two hinges and to the second part with another of the at least two hinges and the hinge plate is configured to facilitate the sliding of the second part to the further position.

Yet still further according to the first aspect of the invention, the second part, when in the initial position, may be substantially parallel to the first functional area of the first part, and the second part, when in the further position, may form a predetermined angle with the first functional area of the first part.

Still yet further according to the first aspect of the invention, the device may be an electronic device, a mechanical device, an electromechanical device, a gaming device, a wireless communication device, a mobile phone, a camera-phone mobile device, a non-portable device, a computer, a video phone or a portable device.

Still further still according to the first aspect of the invention, the first part may be a base and the second part may be a lid.

According to a second aspect of the invention, a method, comprises: rotating a turning part of a device, the rotating part being pivotally connected to a first part of the device, from a first position to a second position by a predetermined angle around a pivotal axis, thus opening the device by sliding a second part from an initial position to a further position, thus opening the device, wherein the first part comprises a first functional area, the second part comprises a second functional area located on an exposed surface of the second part, the turning part is configured to turn by rotating around the pivotal axis in a pre-selected angle range and wherein the second part is configured to cover the first functional area in the initial position and the second part is configured to reveal the first functional area in the second position.

According further to the second aspect of the invention, the method may further comprise: rotating the turning part of the device from the second position to the first position by the predetermined angle around the pivotal axis, thus moving the second part from the further position to the initial position and closing the device by the lid.

Further according to the second aspect of the invention, the second functional area may be a display comprising a viewing surface and the first functional area is a keyboard.

Still further according to the second aspect of the invention, the first functional area may be one of: a) a keyboard, b) a display comprising a viewing surface, c) a touch screen.

According further to the second aspect of the invention, the second functional area may be one of: a) a keyboard, b) a display comprising a viewing surface, and c) a touch screen.

According still further to the second aspect of the invention, the predetermined angle may be 180 degrees.

According further still to the second aspect of the invention, the turning part may comprise a camera which is configured to provide an image when the turning part is in the second position.

According yet further still to the second aspect of the invention, the turning part may be configured to have a groove on a side adjacent to the second part and the second part may be configured to have a pin on a second part side adjacent to the turning part, such that when the turning part is rotated between the first position and the second position, the second part is moved between the initial position covering the first functional area and the further position which reveals the first functional area using the pin which is configured to move along the groove.

Yet still further according to the second aspect of the invention, the adjusting mechanism may comprise: a hinge plate comprising at least two hinges, wherein the hinge plate may be attached to the first part with one of the at least two hinges and to the second part with another of the at least two hinges and the hinge plate may be configured to facilitate the sliding of the second part to the further position.

Still yet further according to the second aspect of the invention, the second part, when in the initial position, may be substantially parallel to the first functional area of the first part, and the second part, when in the further position, may form a predetermined angle with the first functional area of the first part.

Still further still according to the second aspect of the invention, the device may be an electronic device, a mechanical device, an electromechanical device, a gaming device, a wireless communication device, a mobile phone, a camera-phone mobile device, a non-portable device, a computer, a videophone, or a portable device.

Yet still further still according to the second aspect of the invention, the first or the second functional area may be a display and the method may further comprise: indicating a status of the turning part after the rotating on a screen of the display.

According to a third aspect of the invention, a computer program product comprises: a computer readable storage structure embodying computer program code thereon for execution by a computer processor with the computer program code, wherein it includes indicating a status of the turning part after the rotating on a screen of the display after performing the method of the first aspect of the invention, as being performed by the device.

According to a fourth aspect of the invention, a turning part module of a device, comprises: a grasping part, pivotally connected to a first part of the electronic device such that the turning part module is configured to turn by rotating the grasping part by a user around a pivotal axis in an angle range, wherein the first part of the electronic device comprises a first functional area; a second part of the electronic device comprises a second functional area located on an exposed surface of the lid, and the second part is in an initial position and configured to cover the first functional area when the grasping part is in a first position and wherein the second part is configured to slide using an adjusting mechanism to a further position revealing the first functional area when the grasping part is rotated by a predetermined angle in the angle range around the pivotal axis to a second position; and a groove, adjacent to the second part and the second part is configured to have a pin on a second part side adjacent to the turning part, such that when the grasping part is rotated between the first position and the second position, the second part is moved between the initial position covering the first functional area and the further position which reveals the first functional area using the pin which is configured to move along the groove.

According further to the fourth aspect of the invention, the turning part may comprise a pivoting rod configured to provide a pivotal connection to the first part.

Further according to the fourth aspect of the invention, the grasping part may comprise a camera which may be configured to provide an image when the grasping part is in the second position.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

A new apparatus and method are presented for applying a turn and slide concept for opening and closing a device. The device may be (but is not limited to): an electronic device, a mechanical device, an electromechanical device, a gaming device, a wireless communication device, a mobile phone, a camera-phone mobile device, a non-portable device, a computer, a portable device, a video phone, etc.

According to an embodiment of the present invention, a turning part of the device can be configured to turn by rotating around a pivotal axis in a pre-selected angle range, e.g., from a first position to a second position by a predetermined angle, wherein the turning part is being pivotally connected to a first part (e.g., a base) of said device, thus sliding a second part from an initial position to a further position using an adjusting mechanism and opening the device. Further, the first part may comprise a first functional area and the second part (e.g., a lid) may comprise a second functional area located on an exposed surface of the second part, wherein the second part is configured to cover the first functional area in the initial position and the second part is configured to reveal the first functional area in the second position. Moreover, the turning part can be turned back from the second position to the first position by the predetermined angle (by rotating back around the pivotal axis), thus closing the device by moving the second part from the further position to the initial position.

According to further embodiments of the present invention, the second or the first functional area may be a display (e.g., a touch screen) comprising a viewing surface or a keyboard (e.g., with a QWERTY layout). For example, the second functional area may be the display comprising the viewing surface and the first functional area may be the keyboard.

According to another embodiment, the predetermined angle may be 180 degrees which would be a natural movement for a human hand.

Furthermore, the turning part may have a groove on a side adjacent to said second part and the second part then may have a pin on its side adjacent to the turning part, such that when the turning part is rotated between the first position and the second position, the second part is configured to move between an initial position with the second part covering said first functional area and the further position with the second part revealing the first functional area using the pin moving along the groove, thus opening or closing the device. Moreover, the device can be "locked" in the open or closed position using methods well known in the art. In addition, the device can be configured to make a "click" (i.e., a sound) when it reaches the open or closed position (the "clicks" for the open and closed positions can have a different pitch). According to a further embodiment, where the first or the second functional area is a display, the status of rotating said turning part (which opens or closes the device) can be displayed on a screen of said display.

According to one embodiment of the present invention, the adjusting mechanism may comprise a hinge plate having at least two hinges, wherein the hinge plate is attached to the first part with one of the at least two hinges and further attached to the moving part with another of the at least two hinges and the hinge plate is configured to facilitate the sliding of said second part to the further position. Still further, in another embodiment of the present invention, the second part (e.g., having a display), when in the initial position, may be substantially parallel to the first functional area (e.g., the keyboard) of the first part and, when in the further position, the second part may form a predetermined angle with the first functional area of the base. Yet still further, the turning part may comprise various control/functional features including but not limited to a camera (e.g., mounted on a 45 degrees angle) which may be configured to provide an image during a video call (e.g., for applications of the device as a video phone) when the turning part is in the second position. Furthermore, the camera can provide a video when the electronic device is in the open position and also can take photo pictures when the electronic device is in the closed position.

Figure 1A:
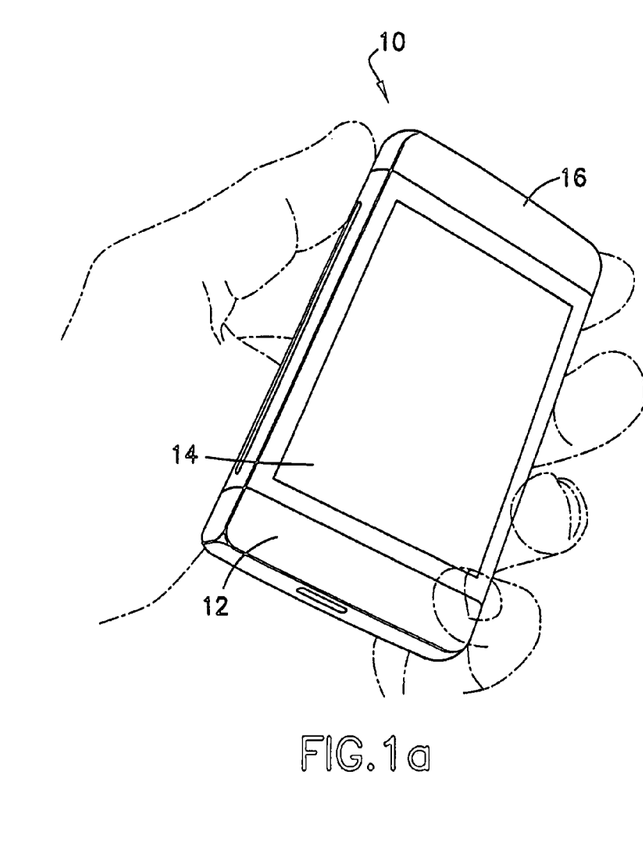
FIGS. 1a and 1b are perspective views of a device: a) in a folded (closed) position and b) in unfolded (open) position revealing (exposing) a keyboard, according to an embodiment of the present invention.
Figure 1B:
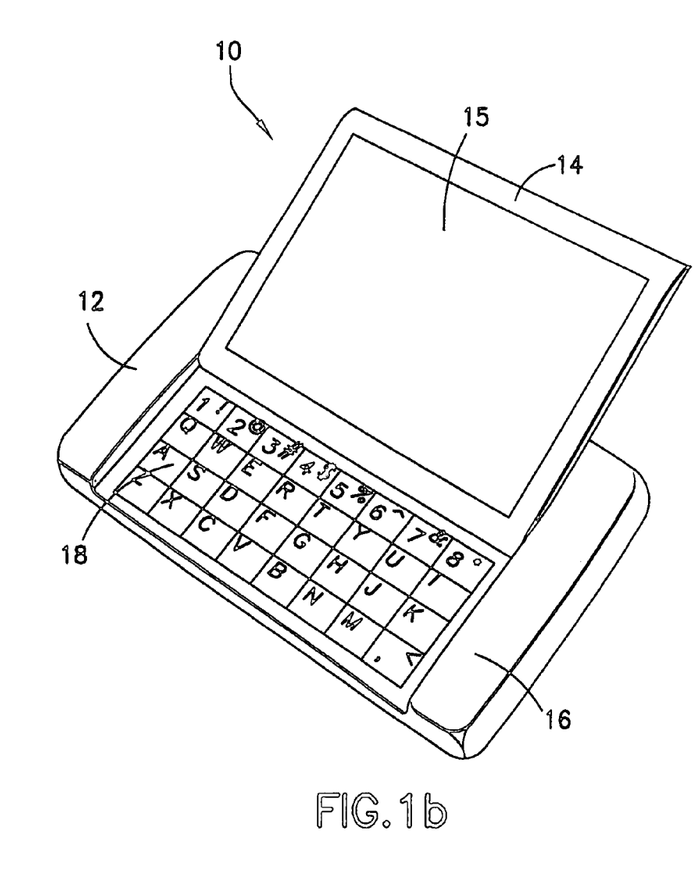

FIGS. 1a and 1b show examples among others of perspective views of a device 10: a) in a folded (closed) position and b) in unfolded (open) position revealing or exposing a keyboard (e.g., with a QWERTY layout) 18, according to an embodiment of the present invention.

The device 10 can comprise a base 12 with a first functional area (e.g., the QWERTY keyboard) 18, a lid 14 comprising a second functional area 15 (e.g., a viewing display) located on an exposed surface of the lid 14 and a turning part 16, pivotally connected to the base 12 such that the turning part 16 is configured to turn by rotating around a pivotal axis in a pre-selected angle range. As shown in FIG. 1a, the device 10 is in the closed position, i.e., the turning part 10 is in the first position and the lid 14 is in the initial position covering the first functional area (keyboard) 18 (the keyboard 18 is only seen in FIG. 1b). As shown in FIG. 1b, the device 10 is in the open position, i.e., the turning part 10 is in the second position and the lid 14 is moved (or slid) to the further position revealing the first functional area (the keyboard) 18 using an adjusting mechanism.

Figure 2A:
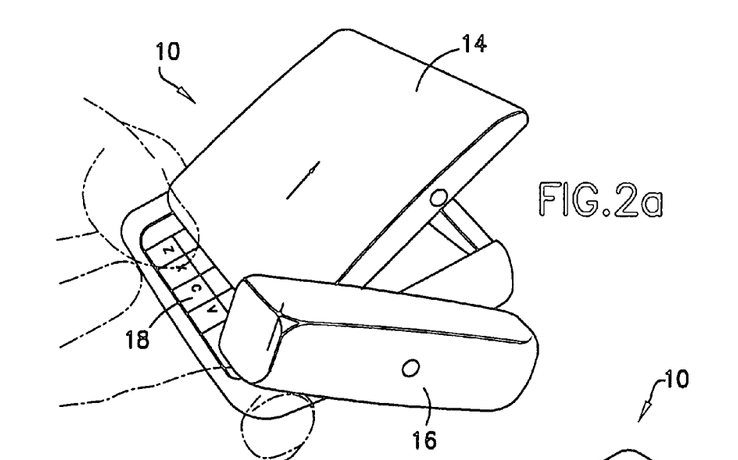
FIGS. 2a through 2c are perspective views of a device: a) when a turning part starts to turn from a first position and the lid starts to slide thus revealing a keyboard, b) when the turning part is in a mid position, and c) when the turning part is in a further position and the keyboard is completely revealed, according to an embodiment of the present invention.
Figure 2B:
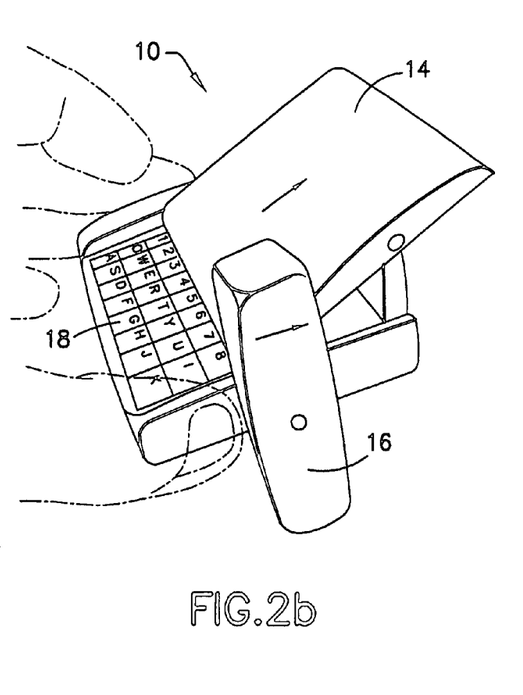
Figure 2C:
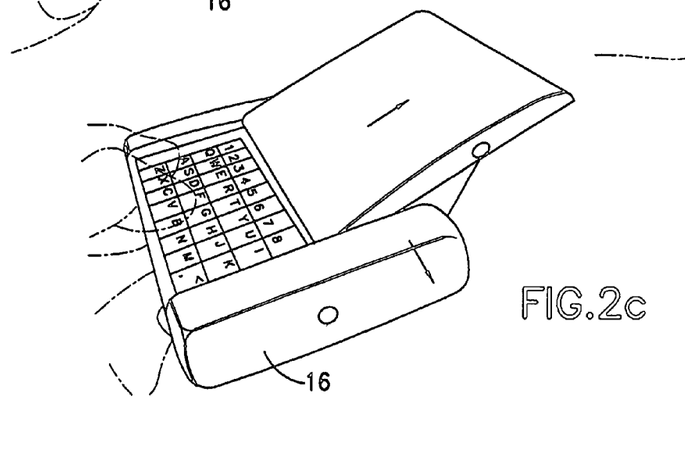

FIGS. 2a through 2c show examples among others of perspective views of the device 10: FIG. 2a shows the moment when the turning part 16 starts to turn from a first position and the lid 14 starts to slide thus revealing a keyboard, 18, FIG. 2b shows the moment when the turning part 16 is in a mid position while it is rotated from the first to the second position and revealing more of the keyboard 18, and FIG. 2c shows the moment when the turning part 14 is in the further position and the keyboard 18 is completely revealed, according to an embodiment of the present invention. It is seen, that in the initial position, the lid 14 may be substantially parallel (as shown in FIG. 2a) to the first functional area, i.e., to the keyboard 18 of the base 12. However, in the further position, the lid 14 may form a predetermined angle (as shown in FIG. 2c) with the first functional area, e.g., in order to provide a comfortable viewing angle for a user of the device in case the second functional area is a display.

Figures 3A, 3B, 3C:
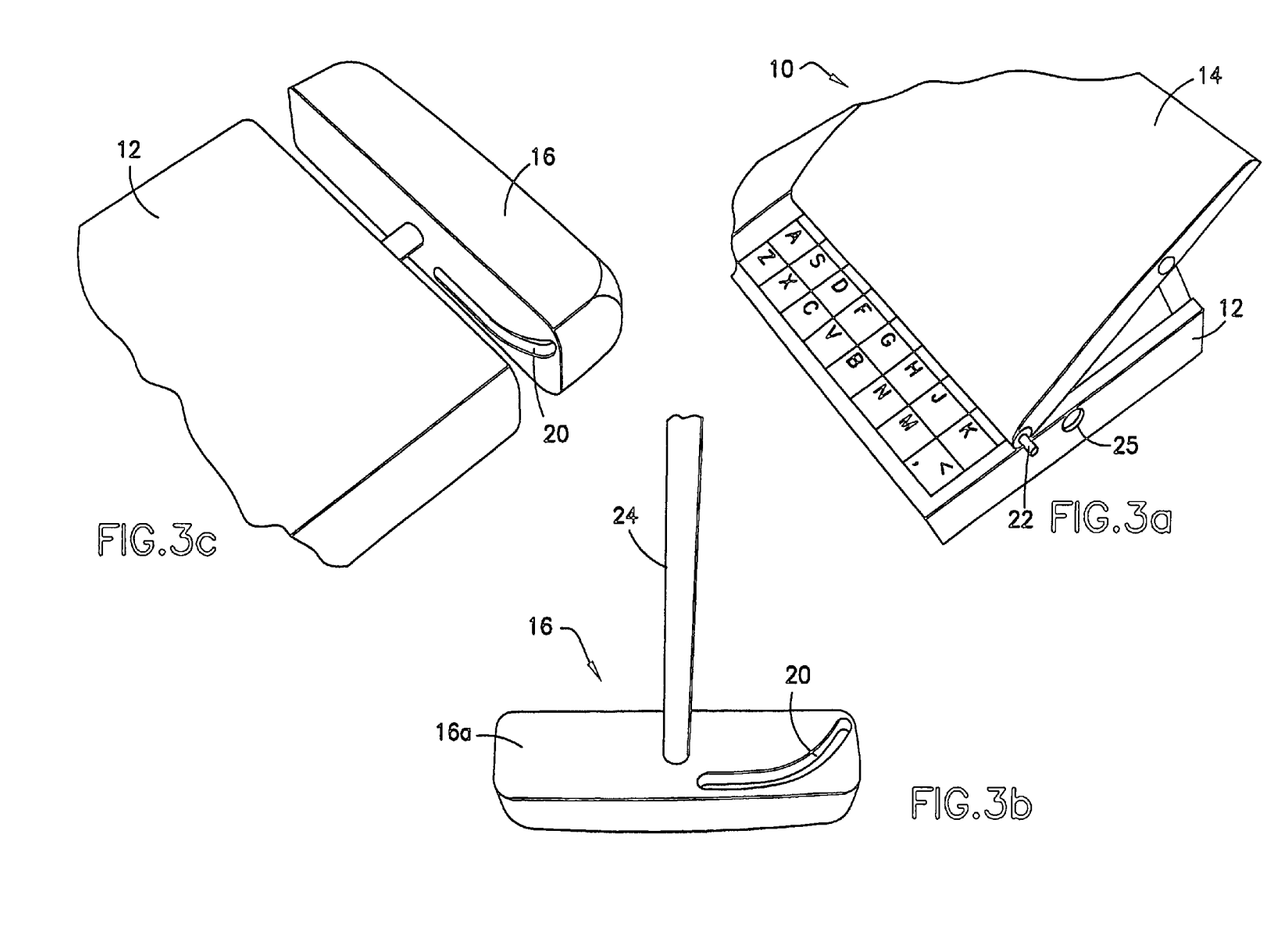
FIGS. 3a through 3c are perspective views of: a) a device with a lid having a pin, b) a turning part having a groove; and c) an assembly of a turning part with a base of the device, according to an embodiment of the present invention.

FIGS. 3a through 3c show further examples among others of perspective views of the device 10 describing more implementation details, according to further embodiments of the present invention. FIG. 3a shows the device 10 with the lid 18 having a pin 22. FIG. 3b shows the turning part (or a turning part module) 16 having a grasping part 16a, a groove 20 and a pivoting rod 24 and FIG. 3c illustrates an assembly of the turning part 16 with the base 12 of the device 10, wherein the pivoting rod 24 is inserted into the hole 25 (shown in FIG. 2b) of the base 12, according to other embodiments of the present invention.

Figure 4:
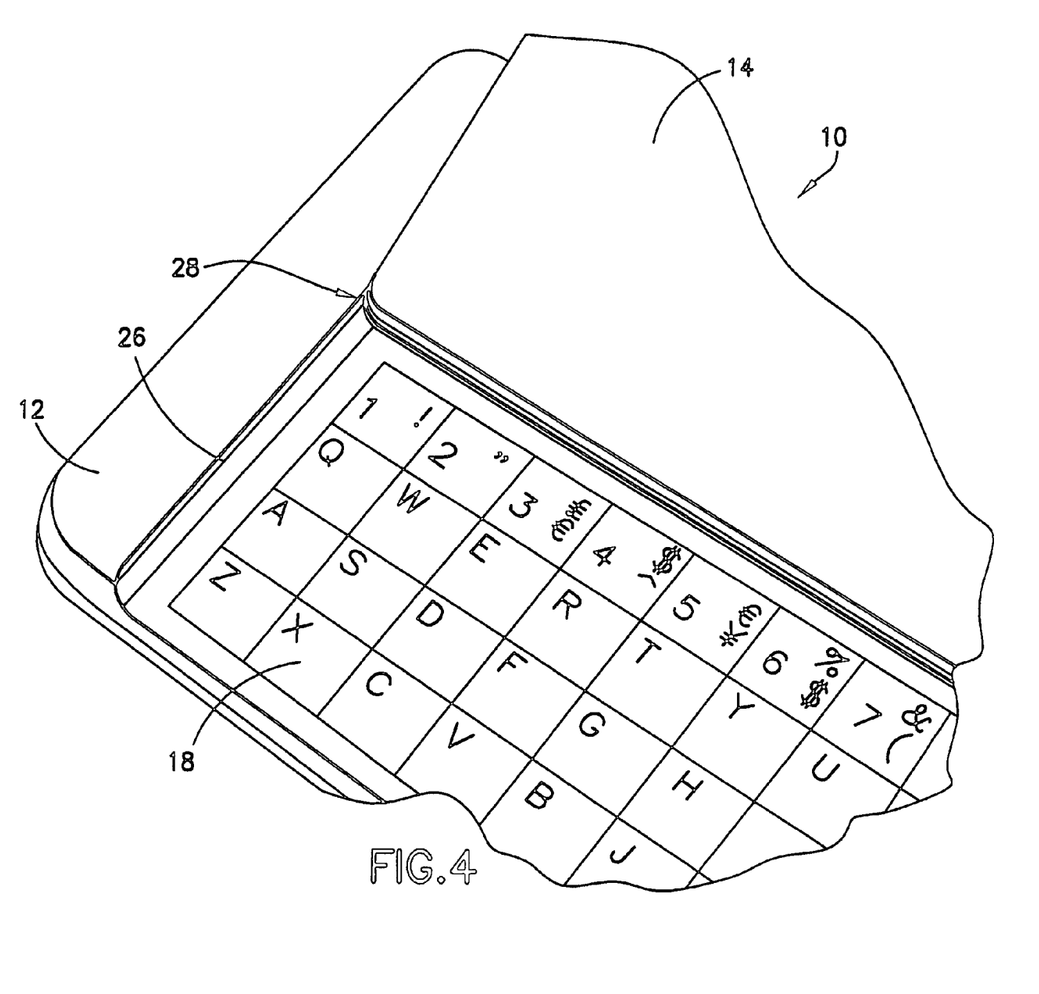
FIG. 4 is a perspective view of a device with a base having a sliding groove and with a lid having a holding pin for sliding the lid and for preventing it from tilting up during the sliding, according to an embodiment of the present invention.
Figure 5:
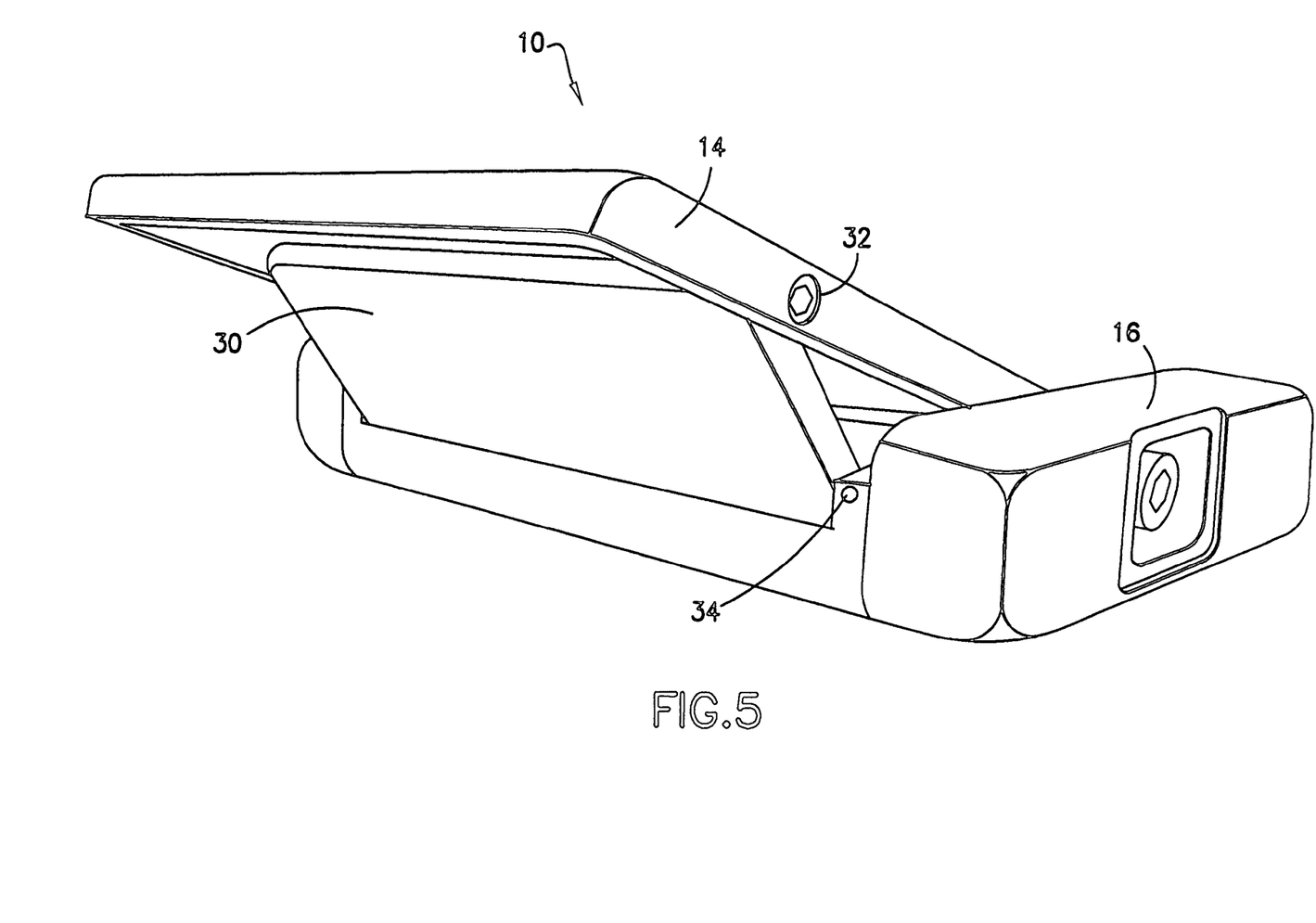
FIG. 5 is a perspective view of a device with an adjusting mechanism comprising a hinge plate and two hinges, according to an embodiment of the present invention.

When the turning part 16 is rotated (e.g., the user rotates the grasping part 16a) between the first position and the second position as described above, the pin 22 is configured to move along the groove 20 thus facilitating the lid 14 to move between the initial position and the further position using the adjusting mechanism. FIGS. 4 and 5 further describe the performance of the adjusting mechanism for moving the lid 14 between the initial and the further positions.

FIG. 4 shows an example among others of a perspective view of the device 10 with a base 12 having a sliding groove 26 and with a lid 14 having a holding pin 27 to guide and prevent the lid 12 from tilting up during the sliding described above, according to an embodiment of the present invention. In other words, when the turning part 16 is rotated between the first position and the second, the pin 28 is configured to move along the groove 26 thus facilitating the lid 14 to move between the initial position and the further position and preventing it from tilting up.

FIG. 5 shows another example among others of a perspective view of the device 10 with an adjusting mechanism comprising a hinge plate 30 and at least two hinges 32 and 34, respectively, according to an embodiment of the present invention. The hinge plate 30 is attached to the base 12 with the hinge 34 and to the lid 14 with another hinge 32 which facilitates the smooth sliding of the lid 14 between the initial and further positions. The hinge plate 30 and hinges 32 and 34 provide the appropriate orientation of the lid 14 in the initial and the further positions as shown in FIGS. 2a and 2c.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A device, comprising:
    a first part comprising a first functional area;
    a second part comprising a second functional area located on an exposed surface of said second part; and
    a turning part, pivotally connected to said first part such that said turning part is configured to turn by rotating around a pivotal axis in an angle range,
    wherein said second part is in an initial position and configured to cover said first functional area when said turning part is in a first position and wherein said second part is configured to slide using an adjusting mechanism to a further position revealing said first functional area when said turning part is rotated by a predetermined angle in said angle range around said pivotal axis to a second position.

2. The device of claim 1, wherein said second functional area is a display comprising a viewing surface and said first functional area is a keyboard.

3. The device of claim 1, wherein said first functional area is one of:
- a keyboard
- a display comprising a viewing surface, and
- a touch screen.

4. The device of claim 1, wherein said second functional area is one of:
- a keyboard
- a display comprising a viewing surface, and
- a touch screen.

5. The device of claim 1, wherein said predetermined angle is 180 degrees.

6. The device of claim 1, wherein said turning part comprises a camera which is configured to provide at least one of:
- a video image when the turning part is in the second position and
- photo pictures when the turning part is in the first position.

7. The device of claim 1, wherein said turning part is configured to have a groove on a side adjacent to said second part and said second part is configured to have a pin on a second part side adjacent to said turning part, such that when said turning part is rotated between the first position and the second position, the second part is moved between the initial position covering said first functional area and the further position which reveals said first functional area using said pin which is configured to move along said groove.

8. The device of claim 1, wherein said adjusting mechanism comprises:
- a hinge plate comprising at least two hinges, wherein said hinge plate is attached to said base with one of said at least two hinges and to said second part with another of said at least two hinges and the hinge plate is configured to facilitate said sliding of said second part to said further position.

9. The device of claim 1, wherein said second part, when in said initial position, is substantially parallel to the first functional area of said first part, and said second part, when in said further position, forms a predetermined angle with the first functional area of said first part.

10. The device of claim 1, wherein said first part is a base and said second part is a lid.

11. A method, comprising:
- rotating a turning part of a device from a first position to a second position by a predetermined angle around a pivotal axis for opening said device by sliding a second part from an initial position to a further position, said turning part being pivotally connected to a first part of said device, wherein the first part comprises a first functional area, the second part comprises a second functional area located on an exposed surface of said second part, and the turning part is configured to turn by rotating around the pivotal axis in a pre-selected angle range, and wherein said second part is configured to cover said first functional area in said initial position and further configured to reveal said first functional area in said second position.

12. The method of claim 11, further comprising:
- rotating the turning part of said device from the second position to the first position by the predetermined angle around the pivotal axis; for moving the second part from the further position to the initial position and closing said device by said lid.

13. The method of claim 11, wherein said second functional area is a display comprising a viewing surface and said first functional area is a keyboard.

14. The method of claim 11, wherein said first functional area is one of:
- a keyboard,
- a display comprising a viewing surface and
- a touch screen.

15. The method of claim 11, wherein said second functional area is one of:
- a keyboard
- a display comprising a viewing surface, and
- a touch screen.

16. The method of claim 11, wherein said predetermined angle is 180 degrees.

17. The method of claim 11, wherein said turning part comprises a camera which is configured to provide an image when the turning part is in the second position.

18. The method of claim 11, wherein said turning part is configured to have a groove on a side adjacent to said second part and said second part is configured to have a pin on a second part side adjacent to said turning part, such that when said turning part is rotated between the first position and the second position, the second part is moved between the initial position covering said first functional area and the further position which reveals said first functional area using said pin which is configured to move along said groove.

19. The method of claim 11, wherein said adjusting mechanism comprises:
- a hinge plate comprising at least two hinges, wherein said hinge plate is attached to said first part with one of said at least two hinges and to said second part with another of said at least two hinges and the hinge plate is configured to facilitate said sliding of said second part to said further position.

20. The method of claim 11, wherein said second part, when in said initial position, is substantially parallel to the first functional area of said first part, and said second part, when in said further position, forms a predetermined angle with the first functional area of said first part.

21. The method of claim 11, wherein said device is an electronic device, a mechanical device, an electro-mechanical device, a gaming device, a wireless communication device, a mobile phone, a camera-phone mobile device, a non-portable device, a computer, a videophone, or a portable device.

22. The method of claim 11, wherein the first or the second functional area is a display and the method further comprising:
- indicating a status of said turning part after said rotating on a screen of said display.

23. A computer program product comprising: a computer readable storage structure embodying computer program code thereon for execution by a computer processor with said computer program code, wherein said computer program code includes indicating a status of said turning part after said rotating on a screen of said display after performing the method of claim 11 as being performed by the device.

24. A turning part module of a device, comprising
- a grasping part, pivotally connected to a first part of said device such that said turning part module is configured to turn by rotating the grasping part by a user around a pivotal axis in an angle range, wherein
  - the first part of the device comprises a first functional area;

a second part of the device comprises a second functional area located on an exposed surface of said second part lid, and said second part is in an initial position and configured to cover said first functional area when said grasping part is in a first position and wherein said second part is configured to slide using an adjusting mechanism to a further position revealing said first functional area when said grasping part is rotated by a predetermined angle in said angle range around said pivotal axis to a second position; and a groove, adjacent to said second part and said second part is configured to have a pin on a second part side adjacent to said turning part, such that when said grasping part is rotated between the first position and the second position, the second part is moved between the initial position covering said first functional area and the further position which reveals said first functional area using said pin which is configured to move along said groove.

25. The turning part module of claim 24, wherein said turning part comprises a pivoting rod configured to provide a pivotal connection to said first part.

26. The turning part module of claim 24, wherein said grasping part comprises a camera which is configured to provide an image when the grasping part is in the second position.

27. A device, comprising:
means for holding, comprising a first functional area;
means for sliding, comprising a second functional area located on an exposed surface of said means for sliding; and
means for turning, pivotally connected to said first means such that said turning part is configured to turn by rotating around a pivotal axis in an angle range,
wherein said means for sliding is in an initial position and configured to cover said first functional area when said means for turning is in a first position and wherein said means for sliding is configured to slide using an adjusting mechanism to a further position revealing said first functional area when said means for turning is rotated by a predetermined angle in said angle range around said pivotal axis to a second position.

28. The device of claim 27, wherein said second functional area is a display comprising a viewing surface and said first functional area is a keyboard.

* * * * *

UNITED STATES PATENT AND TRADEMARK OFFICE
CERTIFICATE OF CORRECTION

PATENT NO. : 7,499,264 B2  Page 1 of 1
APPLICATION NO. : 11/417539
DATED : March 3, 2009
INVENTOR(S) : Pasi Kemppinen It is certified that error appears in the above-identified patent and that said Letters Patent is hereby corrected as shown below:

In column 9, line 3, claim 24 "lid" should be deleted.

Signed and Sealed this

Twenty-first Day of April, 2009

JOHN DOLL
*Acting Director of the United States Patent and Trademark Office*